(12) United States Patent
Turner et al.

(10) Patent No.: US 7,178,426 B2
(45) Date of Patent: Feb. 20, 2007

(54) ENHANCED LUBRICATION SYSTEM FOR DRIVE AXLE ASSEMBLIES

(75) Inventors: Gary A. Turner, Three Rivers, MI (US); Leo Wenstrup, Portage, MI (US)

(73) Assignee: Dana Corporation, Toledo, OH (US)

( * ) Notice: Subject to any disclaimer, the term of this patent is extended or adjusted under 35 U.S.C. 154(b) by 167 days.

(21) Appl. No.: 10/948,603

(22) Filed: Sep. 23, 2004

(65) Prior Publication Data

US 2006/0063633 A1 Mar. 23, 2006

(51) Int. Cl.
*F16H 57/02* (2006.01)

(52) U.S. Cl. ........................................ 74/607; 184/11.1

(58) Field of Classification Search ................. 74/607, 74/606 R, 606 A; 475/160; 180/339, 378; 184/6.21, 6.24, 6.12, 13.1, 11.1–11.5
See application file for complete search history.

(56) References Cited

U.S. PATENT DOCUMENTS

| | | | |
|---|---|---|---|
| 1,876,439 A | | 9/1932 | Whaley |
| 1,966,434 A | * | 7/1934 | Barker ...................... 184/11.1 |
| 2,225,205 A | | 12/1940 | Brooks |
| 2,356,953 A | | 8/1944 | Snow |
| 2,677,440 A | | 5/1954 | Willis |
| 3,213,531 A | * | 10/1965 | Wylie .......................... 29/463 |
| 3,502,176 A | | 3/1970 | Terry |
| 3,847,249 A | | 11/1974 | Oehring |
| 4,261,219 A | | 4/1981 | Suzuki et al. |
| 4,459,208 A | * | 7/1984 | Lemon ........................ 210/168 |
| 5,259,194 A | * | 11/1993 | Okada .......................... 60/456 |
| 5,453,181 A | | 9/1995 | Dahlback et al. |
| 5,476,582 A | | 12/1995 | Camping |
| 5,540,300 A | | 7/1996 | Downs et al. |
| 5,839,327 A | | 11/1998 | Gage |
| 6,015,444 A | * | 1/2000 | Craft et al. .................... 55/320 |
| 6,132,329 A | * | 10/2000 | Tison ......................... 475/160 |
| 6,267,203 B1 | | 7/2001 | Brissette et al. |
| 6,299,561 B1 | * | 10/2001 | Kramer et al. .............. 475/160 |
| 6,938,731 B2 | * | 9/2005 | Slesinski .................... 184/6.25 |
| 2002/0002096 A1 | | 1/2002 | Ruehle et al. |
| 2003/0000337 A1 | | 1/2003 | Camping |

FOREIGN PATENT DOCUMENTS

| | | |
|---|---|---|
| DE | 376381 | 5/1923 |
| GB | 1007491 | 10/1965 |
| GB | 2103301 | 2/1983 |
| JP | 2003-014093 | 1/2003 |

* cited by examiner

*Primary Examiner*—Roger Pang
*Assistant Examiner*—Justin K. Holmes
(74) *Attorney, Agent, or Firm*—Dykema Gossett PLLC

(57) ABSTRACT

An improved lubrication system for drive axle assemblies is provided that uses a collector in connection with a filter plug to lower the dynamic lubricant level in the drive axle assembly and filter contaminants in the lubricant sump. The collector is affixed to a cover plate attached to the drive axle housing and defines a well and a flow passage proximate the bottom of the well. The flow passage is aligned with an opening through which lubricant is inserted into the housing. A plug with a filter is inserted through the opening in the cover plate and into the flow passage. The invention reduces churning losses by lowering the dynamic lubricant level in the axle assembly without having a negative impact on lubricant life.

8 Claims, 2 Drawing Sheets

ENHANCED LUBRICATION SYSTEM FOR DRIVE AXLE ASSEMBLIES

BACKGROUND OF THE INVENTION

1. Field of the Invention

The present invention relates to drive axle assemblies, and more particularly, to a drive axle assembly with structure designed to improve drive axle lubrication.

2. Discussion of Related Art

Most vehicles include one or more drive axle assemblies. A conventional drive axle assembly includes a pair of axle half shafts extending from a housing on which one or more wheels of a vehicle are mounted. The axle half shafts in the drive axle assembly are driven by a wheel differential disposed within the housing. The wheel differential includes a pinion gear in mesh with a ring gear (which in turn drives a plurality of bevel gears to cause rotation of the axle half shafts).

The drive axle assembly housing commonly has a front opening to allow for connection of an input shaft with an exterior yoke or flange which is in turn connected with a drive shaft of the vehicle. The input shaft powers the pinion gear of the wheel differential.

The drive axle assembly housing also commonly has a rear opening which is closed by a cover plate. The cover plate and drive axle assembly housing provide a lubricant sump or reservoir. The cover plate includes a relatively small opening through which lubricant is inserted into the drive axle assembly and into the sump. A plug is provided to close the opening.

In a conventional drive axle assembly, the ring gear picks up lubricant from the sump and causes lubricant movement so that lubricant is circulated within the drive axle assembly to lubricate the moving parts of the drive axle assembly. Conventional drive axle assemblies may contain deflectors to direct the lubricant or control lubricant levels. Conventional assemblies also may include filters to remove contaminants from the lubricant.

Conventional drive axle assemblies have several drawbacks. Conventional assemblies require the ring gear to churn through a relatively large amount of lubricant in the drive axle assembly. This churning has a negative impact on efficiency and fuel economy and also increases the temperature of the lubricant. One option for reducing churning losses is to reduce the lubricant level within the drive axle assembly. Doing so, however, reduces the useful life of the lubricant thereby increasing required maintenance (including more frequent draining and refilling of lubricant). Conventional drive axle assemblies also frequently suffer from the introduction of contaminants into the lubricant. Foundry sand may be present due to insufficient cleaning of the housing before the axle assembly operation. Further, operation of the assembly can cause particles of metal to be introduced into the lubricant. One option for addressing contamination is to use a filtration system to remove various contaminants present in the lubricant sump. Conventional filtration systems, however, typically require drainage of the lubricant to service the filtration system.

The inventors herein have recognized a need for a drive axle assembly that will minimize and/or eliminate the above-identified deficiencies.

SUMMARY OF THE INVENTION

The present invention provides a drive axle assembly. The drive axle assembly includes a drive axle housing, first and second axle half shafts extending from opposite sides of the drive axle housing, and a differential disposed within the drive axle housing. The differential includes a pinion gear driven by an input shaft, a ring gear driven by the pinion gear, and a plurality of differential gears driven by the ring gear and drivingly coupled to the first and second axle half shafts. The drive axle assembly further includes a cover plate coupled to the drive axle housing. The drive axle housing and cover plate define a sump. The cover plate includes an opening through which lubricant is inserted and received in the sump. The drive axle assembly further includes a collector mounted to the cover plate. The collector defines a well and a flow passage proximate the bottom of the well. The flow passage has an inlet and an outlet. The drive axle assembly further includes a plug inserted through the opening in the cover plate and into the flow passage in the collector. The plug has a filter disposed between the inlet and the outlet in the flow passage wherein at least a portion of the lubricant splashed by the ring gear is captured by the collector and returned to the sump after passing through the filter.

A drive axle assembly in accordance with the present invention is advantageous as compared to existing drive axle assemblies. The inventive drive axle assembly uses a collector to reduce churning losses by lowering the dynamic lubricant level in the axle assembly without having a negative impact on lubricant life. The inventive assembly maintains or extends existing lubricant drain intervals because the total amount of lubricant in the axle is maintained. The reduced churning losses of the inventive assembly lower the operating temperature of the lubricant sump. Reduction in churning loss and lubricant sump temperature improves efficiency and fuel economy. In addition to the use of a collector, the inventive assembly also provides a means for filtering contaminants in the lubricant sump. By mounting the filter in the plug for the cover plate opening, repair or servicing of the filter is made easier.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
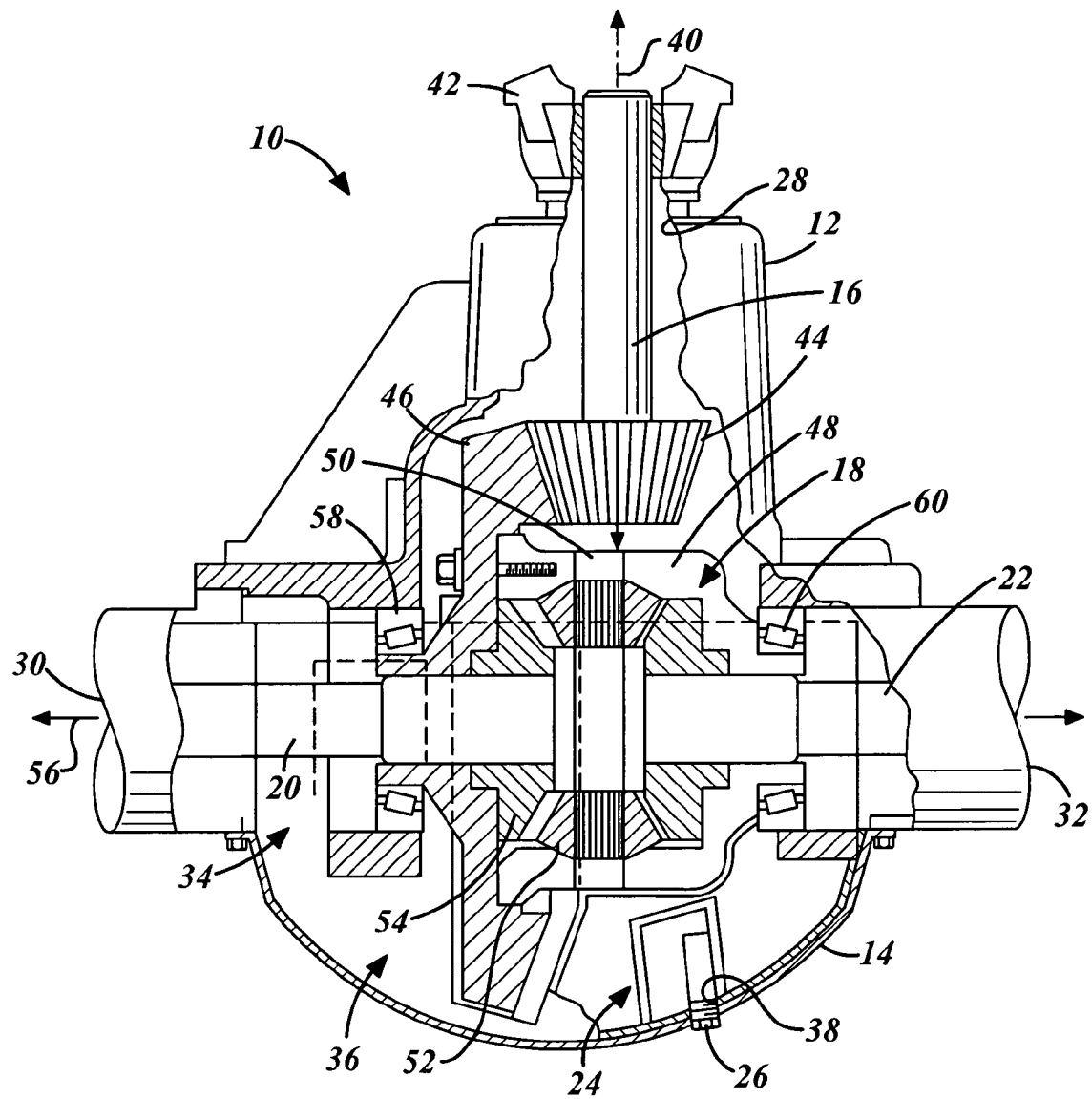
FIG. 1 is a cross-sectional view of a drive axle assembly in accordance with the present invention.

Referring now to the drawings wherein like reference numerals are used to identify identical components in the various views, FIG. 1 illustrates a drive axle assembly 10 in accordance with the present invention. Assembly 10 is particularly adapted for use in medium and heavy trucks. It should be understood, however, that the present invention is not limited to use in medium or heavy trucks and may be used in a wide variety of vehicles and non-vehicular applications. Assembly 10 is provided to drive wheels (not shown) supported on either side of assembly 10. Assembly 10 may include a drive axle housing 12, a cover plate 14, an input shaft 16, a differential 18 and axle half shafts 20, 22. In accordance with the present invention, assembly 10 includes a collector 24 and a plug 26.

Housing 12 provides structural support for the other components of assembly 10. Housing 12 also protects the other components of assembly 10 from foreign objects and elements. Housing 12 may be made from conventional metals and metal alloys such as steel and may include multiple members that are sized relative to components of assembly 10 and coupled together using conventional fasteners. Housing 12 defines a forward opening 28 through which input shaft 16 extends, side openings 30, 32 through which axle half shafts 20, 22 extend, and a rear opening 34 closed by cover plate 14.

Cover plate 14 closes rear opening 34 in drive axle housing 12 and, together with housing 12, defines a sump 36 in which lubricant collects. Plate 14 is coupled to housing 12 using conventional fasteners such as bolts, screws, pins or welds. Plate 14 includes an opening 38 through which lubricant may be inserted into assembly 10 and received within the sump 36.

Input shaft 16 is provided to transmit torque from a drive shaft (not shown) to differential 18 to drive the wheels (not shown). Shaft 16 is conventional in the art and may be supported for rotation within housing 12 about an axis 40 by bearings (not shown). Input shaft 16 is driven by the drive shaft through a conventional input yoke 42. The input yoke 42 may be splined to the forward end of input shaft 16 and may be retained thereon by a nut and a washer which are disposed about a threaded stud that extends from the forward end of shaft 16 and is integral therewith.

Differential 18 is provided to allow axle half shafts 20, 22 (and the wheels supported on shafts 20, 22) to rotate at different speeds. Differential 18 is conventional in the art and is disposed within housing 12. Differential 18 may include a pinion gear 44, a ring gear 46, a differential case 48, a spider 50, and differential gears 52, 54.

Pinion gear 44 transfers torque from input shaft 16 to ring gear 46. Pinion gear 44 may be made from conventional metals and metal alloys and may comprise a hypoid gear. Gear 44 is disposed about input shaft 16 at a rearward end of shaft 16 and rotates about axis 40, driven by shaft 16. Gear 44 may be integral with input shaft 16 or may be mounted thereto using a conventional spline connection or in other ways customary in the art.

Ring gear 46 provided to transfer torque from pinion gear 44 to case 48, spider 50 and gears 52 and is conventional in the art. Ring gear 46 may also be made from conventional metals and metal alloys and may also comprise a hypoid gear. Gear 46 is in mesh with pinion gear 44 and is driven by gear 44. Gear 46 is also affixed to case 48 or may be integral therewith. Gear 46 is disposed about an axis 56 of rotation. Rotation of gear 46 also causes lubricant to circulate within assembly 10 and causes at least a portion of the lubricant to pass through collector 24 as described in greater detail hereinbelow.

Case 48 retains and supports spider 50 and gears 52, 54. Case 48 is conventional in the art and rotates with ring gear 46. Case 48 is supported for rotation within housing 12 by bearings 58, 60.

Spider 50 provides a mounting arrangement for differential gears 52 and is conventional in the art. Spider 50 is supported within case 48 for rotation therewith in ways customary in the art.

Differential gears 52, 54 transmit torque to axle half shafts 20, 22. Gears 52, 54 are conventional in the art and may comprise conventional bevel gears. Gears 52 are mounted on the arms of spider 50 in a conventional manner and are driven by ring gear 46. Side gears 54 transmit torque from gears 52 to axle half shafts 20, 22. Gears 54 are disposed about axis 56 and are coupled to axle half shafts through a spline connection or in other ways customary in the art.

Shafts 20, 22 drivingly support wheels (not shown) on either side of drive axle assembly 10. Shafts 20, 22 are conventional in the art and extend from opposite sides of drive axle housing 12 through openings 30, 32.

Figure 2:
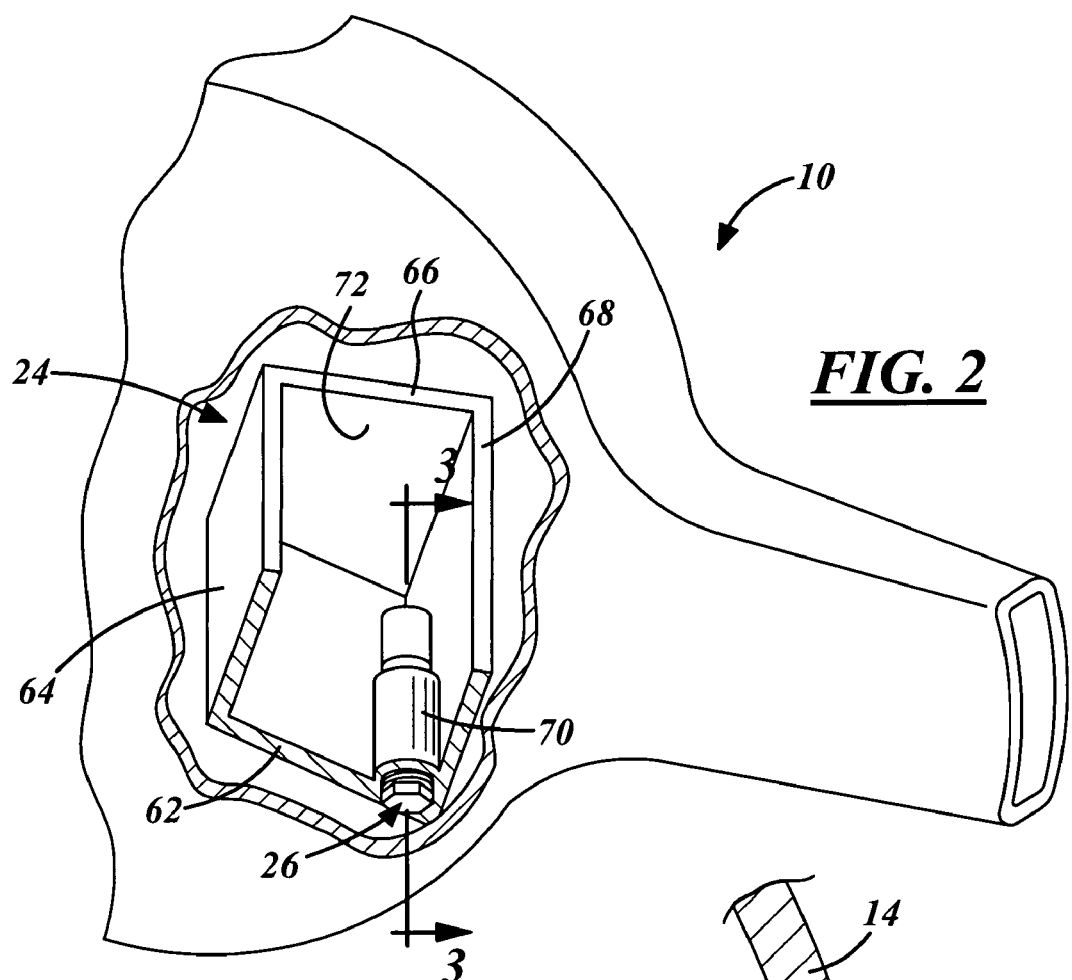
FIG. 2 is a partially cut-away perspective view illustrating a portion of the drive axle assembly of FIG. 1.
Figure 3:
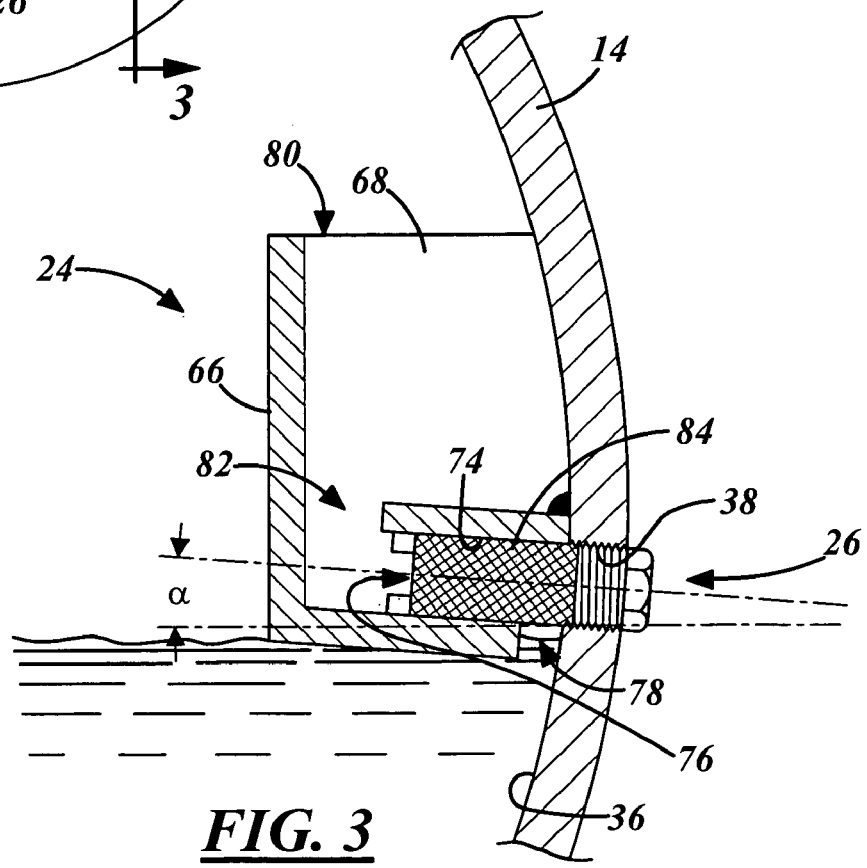
FIG. 3 is a cross-sectional view taken along lines 3—3 of FIG. 2.

Collector 24 is provided to collect a portion of the lubricant splashed by ring gear 46 and other components of assembly 10. Collector 24 is mounted on the inside of cover plate 14. Collector 24 may be mounted to cover plate 14 using one or more welds or using other conventional fasteners. Referring now to FIGS. 2–3, collector 24 may include a bottom wall 62 and side walls 64, 66, 68 (with cover plate 14 defining another wall opposite wall 66). A boss 70 is formed at the intersection of walls 62, 68 for a purpose described hereinbelow. Collector 24 defines a well 72 formed by walls 62, 64, 66, 68 (and cover plate 14). Referring to FIG. 3, collector 24 also defines a flow passage 74 through boss 70 at the bottom of well 72. Flow passage 74 includes an inlet 76 an and outlet 78 and is aligned with opening 38 in cover plate 14. Well 72 has an inlet 80 defined by the edges of walls 64, 66, 68 opposite bottom wall 62 and an outlet 82 proximate inlet 76 of flow passage 74, with inlet 80 being larger in size than outlet 82.

Plug 26 plugs the opening 38 in cover plate 14 through which lubricant is inserted into assembly 10. Plug 26 also contains a filter 84 to filter contaminants from the lubricant. Filter 84 may comprise a mesh screen filter although it should be understood that other filters could be used without departing from the spirit of the present invention. By mounting filter 84 in the plug 26 for the cover plate opening 38, repair or servicing of filter 84 is made easier. Plug 26 is inserted through opening 38 and into flow passage 74 in collector 24 such that filter 84 is disposed between inlet 76 and outlet 78 in flow passage 74. Plug 26 may be screwed into opening 38 and a seal (not shown) may be used to prevent leakage of lubricant. Plug 26 may be angled relative to a horizontal plane and, in particular, may be angled upward relative to the horizontal plane at an angle $\alpha$ of between about four (4) degrees and about twelve (12) degrees. Upon insertion of plug 26, filter 84 is located above the lubricant operating level in sump 36. The location of filter 84 above lubricant operating level provides for servicing of filter 84 without requiring drainage of lubricant in assembly 10.

At least a portion of the lubricant splashed by ring gear 46 and/or other components of assembly 10 enters well 72 of collector 24 through inlet 80. Because the outlet 82 of well 72 is smaller in size than inlet 80, lubricant collects within well 72. In this manner, collector 24 lowers the dynamic lubricant level in assembly 10 to reduce churning losses thereby reducing the operating temperature of the lubricant sump and improving efficiency and fuel economy. Moreover, because the dynamic lubricant level is lowered without reducing the overall amount of lubricant within assembly 10, churning losses are reduced without negatively impacting lubricant life and lubricant drain intervals. The lubricant will collect in well 72 at varying rates based on the speed of rotation of ring gear 46 (collecting more quickly at higher speeds and more slowly during lower speeds requiring more torque) thereby ensuring adequate lubrication for all operating conditions. The collection of lubricant within well 72 is further enhanced and controlled by varying the mesh size of filter 84 and the size of outlet 78 of flow passage 74.

Lubricant in well 72 exits well 72 through outlet 82 and enters flow passage 74 through inlet 76. Lubricant flows into filter 84 in a one direction and flows out of filter 84 in another direction. As shown in FIG. 3, lubricant may flow out of filter 84 through outlet 78 of flow passage 74 in a direction angled relative to the direction of flow into filter 84. The direction of flow outward from filter 84 may be substantially perpendicular to the direction of flow into filter 84. Lubricant exiting collector 24 through outlet 78 of flow passage 74 reenters sump 36 with the maximum level of lubricant in the sump remaining below filter 84.

While the invention has been particularly shown and described with reference to the preferred embodiments thereof, it is well known by those skilled in the art that various changes and modifications can be made in the invention without departing from the spirit and scope of the invention.

We claim:

1. A drive axle assembly, comprising:
   a drive axle housing;
   first and second axle half shafts extending from opposite sides of said drive axle housing
   a differential disposed within said drive axle housing, said differential including a pinion gear driven by an input shaft, a ring gear driven by said pinion gear, and a plurality of differential gears driven by said ring gear and drivingly coupled to said first and second axle half shafts;
   a cover plate coupled to said drive axle housing, said cover plate including an opening through which lubricant is inserted and received in a sump defined by said drive axle housing and said cover plate,
   a collector mounted to said cover plate, said collector defining a well and a flow passage proximate a bottom of said well, said flow passage having an inlet and an outlet;
   a plug inserted through said opening in said cover plate and into said flow passage in said collector, said plug having a filter disposed between said inlet and said outlet in said flow passage
   wherein at least a portion of lubricant splashed by said ring gear is captured by said collector and returned to said sump after passing through said filter.

2. The drive axle assembly of claim 1 wherein a maximum level of said lubricant in said sump is below said filter.

3. The drive axle assembly of claim 1 wherein said plug is angled relative to a horizontal plane.

4. The drive axle assembly of claim 3 wherein said plug is angled upward relative to said horizontal plane such that a first end of said plug is further above said horizontal plane than a second end of said plug, said first end disposed further inward through said opening and in said flow passage than said second end.

5. The drive axle assembly of claim 1 wherein said lubricant flows into said filter in a first direction and flows out of said filter in a second direction, said second direction at an angle relative to said first direction.

6. The drive axle assembly of claim 5 wherein said second direction is substantially perpendicular to said first direction.

7. The drive axle assembly of claim 1 wherein said filter is a mesh screen filter.

8. The drive axle assembly of claim 1 wherein said well in said collector has an inlet and an outlet, said inlet larger in size than said outlet.

* * * * *